S. M. KELLOGG & E. E. BUNKER.
BROOM.
No. 178,011.                                  Patented May 30, 1876.
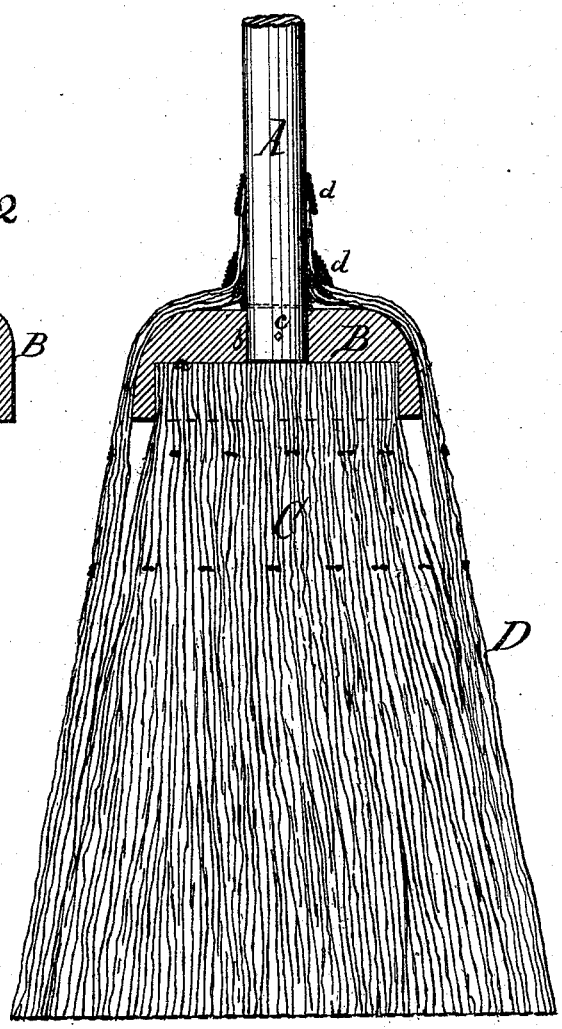

UNITED STATES PATENT OFFICE.

SMITH M. KELLOGG, OF ABSCOTA, AND EDGAR E. BUNKER, OF BRONSON, MICHIGAN.

IMPROVEMENT IN BROOMS.

Specification forming part of Letters Patent No. 178,011, dated May 30, 1876; application filed April 10, 1876.

*To all whom it may concern:*

Be it known that we, SMITH M. KELLOGG, of Abscota, in the county of Calhoun, and EDGAR E. BUNKER, of Bronson, in the county of Branch, and State of Michigan, have invented a new and useful Improvement in Corn-Brooms, which improvement is fully set forth in the following specification, reference being had to the accompanying drawings, in which one of my improved brooms is represented by sectional views—

Figure 1 being a vertical central section of the broom complete, and Fig. 2 a section at right angles to Fig. 1 of the form or mold block.

The nature of our invention consists in a broom having an internal hollow form or mold to which the handle is fastened, and into which the ends of the main portion of the corn-wisps of which the broom is formed are inserted and secured by glue, plaster-of-paris, or other cement, and over which form or mold and cemented short wisps of corn an outside layer of longer wisps of corn is placed and fastened, thus furnishing a broom in which the waste or shorter wisps are utilized as though it were the best material, and, at the same time, a broom is produced having the appearance of one made entirely from material of the first quality.

To enable others skilled in the art to understand our invention, we will proceed to describe it.

In the accompanying drawings, A represents the handle of a broom. B represents a wooden head-block, with a cavity, *a*, in its bottom, and with a central hole, *b*, in it extending down from its top to said cavity. This head-block is designed as a "form" or mold, and its cavity *a* and hole *b* serve for the following purposes: The handle A is inserted into the hole *b* of the head B and secured by a nail, *c*, or other means, and short wisps of corn C, after being tightly packed, their ends cut straight and glued or otherwise cemented, are inserted into the cavity *a* and allowed to set until the cement becomes dry. And then an outside layer, D, of longer wisps of corn is spread and arranged around the head B, handle A, and short wisps C, and there fastened in the usual way with wire *d*. The whole is then shaped and sewed together in the same manner as practiced in the making of ordinary brooms.

The advantages of this construction are many and very important. The broom never gets loose like the common broom, and its length can be greater, at the same or less cost than common brooms, because there are very few long wisps used for covering and fastening to the handle.

The labor and skill required in making our brooms is far less than that required for the manufacture of common brooms, and they may, therefore, be readily made by women and children, and the mold or form enables them to make all the brooms of one pattern.

It might be practicable to substitute other material than broom-corn for the outer layer or covering, but we prefer the corn, as it makes a better finish and more useful broom. When other substance than corn is used for the outer layer, this layer may not extend down to the bottom edge of the inner or main body of the broom.

Having described our invention, what we claim, and desire to secure by Letters Patent, is—

The broom, consisting of the parts A, B, C, and D, constructed substantially as described.

SMITH M. KELLOGG.
EDGAR E. BUNKER.

Witnesses:
L. B. JENNER,
JAMES T. EDDY.